(12) United States Patent
Means et al.

(10) Patent No.: US 12,470,477 B2
(45) Date of Patent: Nov. 11, 2025

(54) METHOD AND SYSTEM FOR ROUTING TRAFFIC TO A LOCAL APPLICATION INTERFACE

(71) Applicant: AT&T Intellectual Property I, L.P., Atlanta, GA (US)

(72) Inventors: Israel Means, Chula Vista, CA (US); Praveen Ramadenu, Torrance, CA (US); Erik Egeland, Atlantic Beach, FL (US); Todd Trautman, Apex, NC (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 38 days.

(21) Appl. No.: 18/472,593

(22) Filed: Sep. 22, 2023

(65) Prior Publication Data
US 2024/0305560 A1  Sep. 12, 2024

Related U.S. Application Data

(60) Provisional application No. 63/488,658, filed on Mar. 6, 2023.

(51) Int. Cl.
*H04L 45/50* (2022.01)
*H04L 45/02* (2022.01)
*H04L 45/24* (2022.01)
*H04L 45/302* (2022.01)
*H04L 45/76* (2022.01)

(52) U.S. Cl.
CPC .......... *H04L 45/306* (2013.01); *H04L 45/025* (2013.01); *H04L 45/24* (2013.01); *H04L 45/50* (2013.01); *H04L 45/76* (2022.05)

(58) Field of Classification Search
CPC ..... H04L 45/025; H04L 45/24; H04L 45/306; H04L 45/50; H04L 45/76
See application file for complete search history.

(56) References Cited

U.S. PATENT DOCUMENTS

| 10,797,992 B2 * | 10/2020 | Blair ................... H04L 12/4633 |
| 2006/0268682 A1 * | 11/2006 | Vasseur ................ H04L 47/728 370/242 |

(Continued)

OTHER PUBLICATIONS

Cisco "BGP Best Path Selection" http://www.cisco.com/c/en/us/support/docs/ip/border-gateway-protocol-bgp/13753-25.pdf (Year: 2017).*

*Primary Examiner* — Glenton B Burgess
*Assistant Examiner* — Patrick F Ngankam
(74) *Attorney, Agent, or Firm* — Guntin & Gust, PLC; Robert Gingher

(57) ABSTRACT

Aspects of the subject disclosure may include, for example, selecting between paths for traffic to be routed between a communication device and an application of a cloud service provider, where the selecting is based on receiving or otherwise obtaining a local path identifier (e.g., announced by a local RIB associated with an intra-metro network over which a local path is connected); and routing the traffic between the communication device and the application of the cloud service provider via the local path responsive to the local path identifier, where the local path bypasses or otherwise avoids an MPLS core, and where a non-local path of the paths is over the MPLS core. Other embodiments are disclosed.

20 Claims, 9 Drawing Sheets

(56) References Cited

U.S. PATENT DOCUMENTS

| | | | |
|---|---|---|---|
| 2010/0097995 A1* | 4/2010 | Murphy | H04W 12/086 |
| | | | 370/328 |
| 2022/0166711 A1* | 5/2022 | Means | H04L 45/586 |
| 2023/0269189 A1* | 8/2023 | Napierala | H04L 61/2514 |
| | | | 370/235 |

* cited by examiner

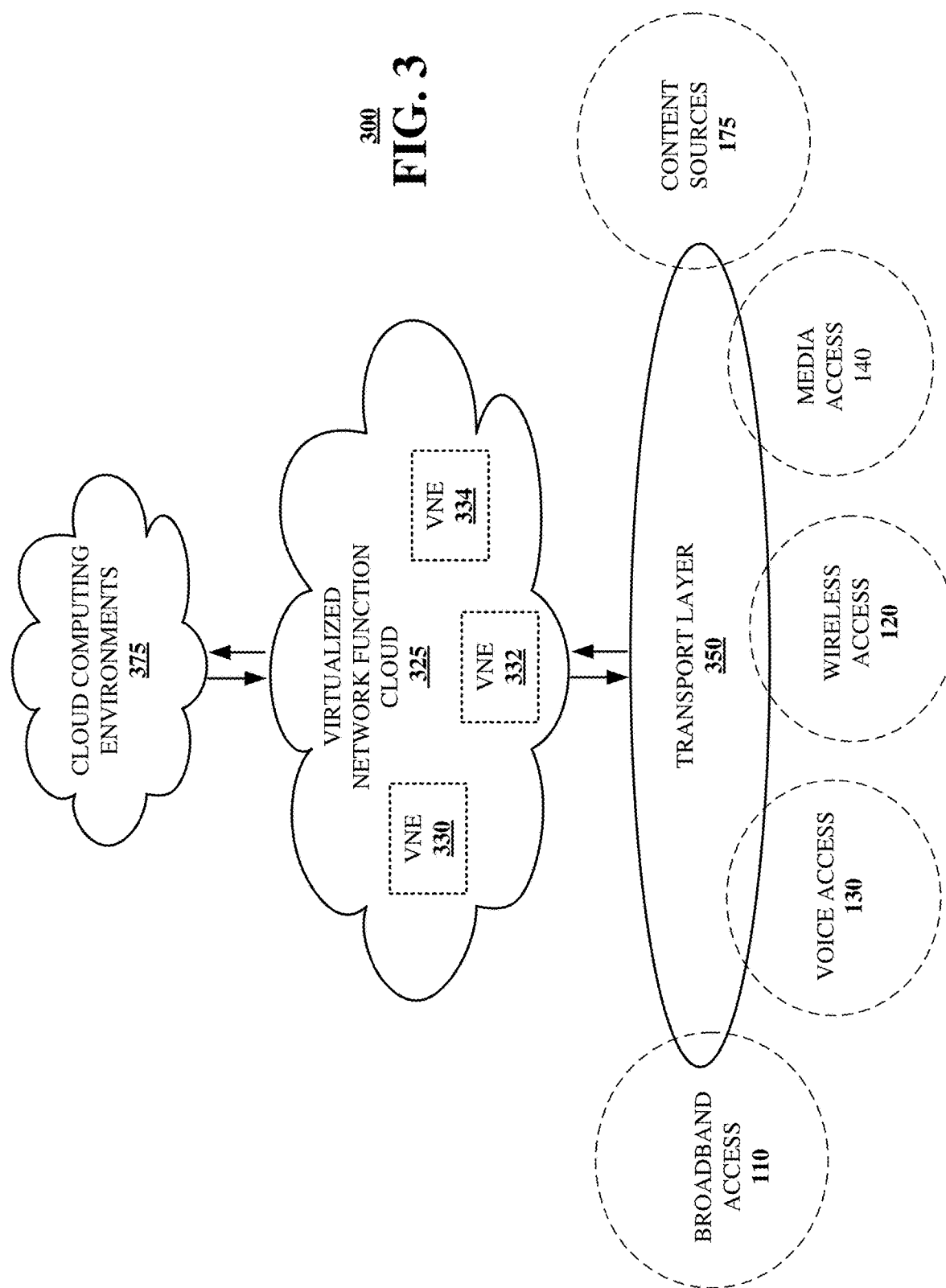

600

METHOD AND SYSTEM FOR ROUTING TRAFFIC TO A LOCAL APPLICATION INTERFACE

CROSS-REFERENCE TO RELATED APPLICATION

This application claims the benefit of and priority to U.S. Provisional Ser. No. 63/488,658, filed Mar. 6, 2023. The contents of the foregoing are hereby incorporated by reference into this application as if set forth herein in full.

FIELD OF THE DISCLOSURE

The subject disclosure relates to a method and system for routing traffic to a local application interface.

BACKGROUND

Cloud applications are generally based on a national model. The majority of hosted applications are supported by cloud providers. The cloud providers lack access networks and by extension lack direct access to the users. Network/communication providers have rich access networks that create connectivity between cloud providers and users. The network architecture supporting user connectivity to the cloud is not latency-based and primarily relies on the Internet model. Users with access to the Internet obtain reachability to the cloud but traffic flows do not maintain application performance objectives resulting in a degraded user experience.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
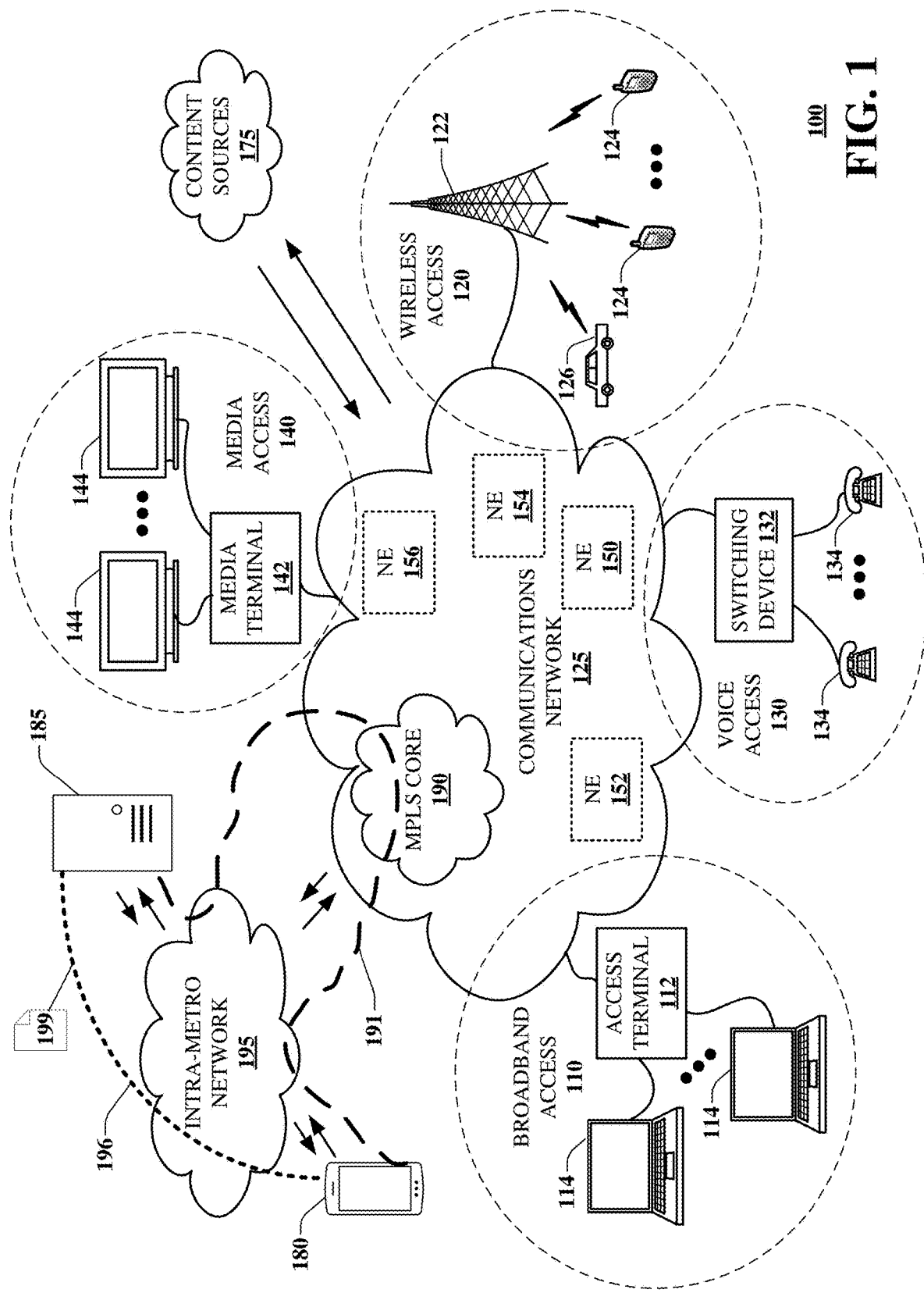
FIG. 1 is a block diagram illustrating an exemplary, non-limiting embodiment of a communications network in accordance with various aspects described herein.

The subject disclosure describes, among other things, illustrative embodiments for dynamically steering traffic over local connections (e.g., bypassing an MPLS core), as compared to national or global connections, where the local connections can offer lower latency and can have overall better network performance. One or more embodiments provide an extension of performance-based network connectivity to the Cloud, which can operate as a foundational capability to facilitate and realize end-to-end application performance needs. In one or more embodiments, users are connected to the network as are cloud providers, and a performance-based routing method and architecture can be implemented to connect users to cloud applications, which considers particular factors or parameters, such as location and network performance characteristics. In one or more embodiments, the performance-based methodology enables application capabilities where application preference requirements are coupled with the network. In one or more embodiments, applications that are more network sensitive can utilize the performance-based methodology to improve the user experience. Other embodiments are described in the subject disclosure.

One or more aspects of the subject disclosure include a device, comprising: a processing system including a processor; and a memory that stores executable instructions that, when executed by the processing system, facilitate performance of operations. The operations include receiving routing information corresponding to an end user device that is announced over a first path via a Multiprotocol Label Switching (MPLS) core; receiving adjusted routing information generated based on the routing information that is announced over a second path that avoids the MPLS core, the adjusted routing information including a local path identifier; and routing traffic to the end user device via the second path according to the local path identifier.

One or more aspects of the subject disclosure are a method that includes selecting, by a processing system including a processor, between first and second paths for traffic to be routed between a communication device and an application of a cloud service provider, wherein the selecting is based on determining that a local path identifier has been received; and routing, by the processing system, the traffic between the communication device and the application of a cloud service provider via the second path responsive to the local path identifier, wherein the first path is via an MPLS core, and wherein the second path avoids the MPLS core.

One or more aspects of the subject disclosure include a non-transitory machine-readable medium, comprising executable instructions that, when executed by a processing system including a processor, facilitate performance of operations. The operations include selecting between paths for traffic to be routed between a communication device and an application of a cloud service provider, where the selecting is based on receiving a local path identifier; and routing the traffic between the communication device and the application of the cloud service provider via a local path responsive to the local path identifier, where the local path bypasses an MPLS core, and where a non-local path of the paths is over the MPLS core.

Referring now to FIG. 1, a block diagram is shown illustrating an example, non-limiting embodiment of a system 100 in accordance with various aspects described herein. In one or more embodiments, end user devices/equipment 180 can be connected to Internet Service Provider (ISP) networks (e.g., network 125) via an access connection, which can include various types of connections including wireless (e.g., 5G, 6G, NG) and/or wireline (e.g., fiber). In one or more embodiments, Cloud Service Provider(s) (CSP(s)) devices/equipment 185 can connect to ISP networks via various types of connections, such as high-speed wireline fiber. In one or more embodiments, user connections can terminate on commercial access devices such Internet Provider Edges (PEs) (e.g., PE routers), fiber access nodes and/or wireless attach point networks. In one or more embodiments, cloud service providers can connect to ISP networks via commercial Internet edge devices. In one or more embodiments, within the ISP network, all devices can be connected to a common Multi-Protocol Label Switched (MPLS) core 190.

In one or more embodiments, deterministic network performance is provided between users and the cloud in a given area by bypassing/avoiding the MPLS core 190 and/or bypassing/avoiding Interior Gateway Protocol (IGP) metric selection techniques. Routing between access and edge devices is typically based on IGP metric(s). In typical network operations, the IGP metric is utilized to determine which edge devices are chosen to send traffic—from user to cloud and from cloud to user. However, the IGP metric does not have awareness of latency or location, and the use of the IGP metric alone does not ensure lowest possible latency.

In one or more embodiments, a local edge device can be deployed or otherwise utilized that connects directly to the Cloud provider and directly to user access nodes. As an example, the embodiment(s) enables bypassing the core 190 and therefore bypassing IGP metric selection. For instance, this architecture can create and deterministically route local traffic to local cloud instances via a local cloud port on the cloud infrastructure PE illustrated as path 196. In one or more embodiments, a local network 195 (e.g., Authentication and Key Agreement (AKA) network, an intra-metro network, and so forth) can be created in parallel with a WAN network (e.g., network 125) which effectively provides a direct on and off ramp to local cloud resources. As an example, the local network paradigm can require or implement direct connections between access devices, 5G edge routers and the cloud infrastructure PE.

In one or more embodiments, a Border Gateway Protocol (BGP) paradigm can be developed in conjunction with the local connectivity. For example, a local BGP routing context can be defined on particular network elements (e.g., each router, edge router(s), and so forth) and can be distinct from the global routing context. In one embodiment, the local BGP Routing Information Base (RIB) can learn BGP prefixes from the local cloud instance. Prefixes imported into the local RIB can be re-distributed to the global RIB with a higher preference via a BGP local community value or local path identifier (e.g., a local-CV). Traffic from end user devices can transit the global RIB and, when there is a local prefix, the traffic will follow the local prefix over the direct links 196 via the cloud infrastructure edge router to the cloud provider 185. In one or more embodiments, prefixes announced from end user devices can be leaked (or otherwise exposed) to the local context and announced to the local cloud instance. In one or more embodiments, similarly in the cloud, there are local and global RIBs, where local routes are preferred.

In one or more embodiments, the capability is provided to map latency sensitive cloud applications to Cloud sites that provide the best or improved latency metric for wireless and/or wireline users. For instance, as the network reach expands, the application latency increases. However, the exemplary embodiments provide a method where the Cloud expands with the network to provide the best or an improved network performance.

In one or more embodiments, dual national and local connectivity architecture is provided, such as connectivity that selectively utilizes (e.g., path 191) and bypasses (e.g., path 196) the MPLS core 190 for various flows. In one or more embodiments, local RIBs and FIBs can be employed in conjunction with the standard RIBs/FIBs (that are in use for routing via the MPLS core).

In one or more embodiments, a local path identifier or local-CV 199 can be implemented as a BGP attribute (which may be non-transitive) for enabling selection of a local path rather than a path via the MPLS core. In one or more embodiments, the BGP decision process can be augmented to prefer a path with a local-CV identifier 199 as part of the best path calculation. In one or more embodiments, a preference and/or priority is given for local paths 196 over all other paths (e.g., paths 191 via the MPLS core 190) according to the presence of the local-CV 199. In one or more embodiments, a dynamic capability is provided to failover (or otherwise switch over) to the national network (e.g., an MPLS core 190) when the local network (e.g., network 195 that bypasses or otherwise avoids the MPLS core) is unavailable or otherwise determined (e.g., based on various factors such as a fault, fiber cut, workload over a particular threshold, amount of traffic over a particular threshold, and so forth) to be undesirable for the traffic flow.

For example, system 100 can facilitate in whole or in part selecting between paths for traffic to be routed between a communication device and an application of a cloud service provider, where the selecting is based on receiving or otherwise obtaining a local path identifier (e.g., announced by a local RIB associated with an intra-metro network over which a local path is connected); and routing the traffic between the communication device and the application of the cloud service provider via the local path responsive to the local path identifier, where the local path bypasses or otherwise avoids an MPLS core, and where a non-local path of the paths is over the MPLS core. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
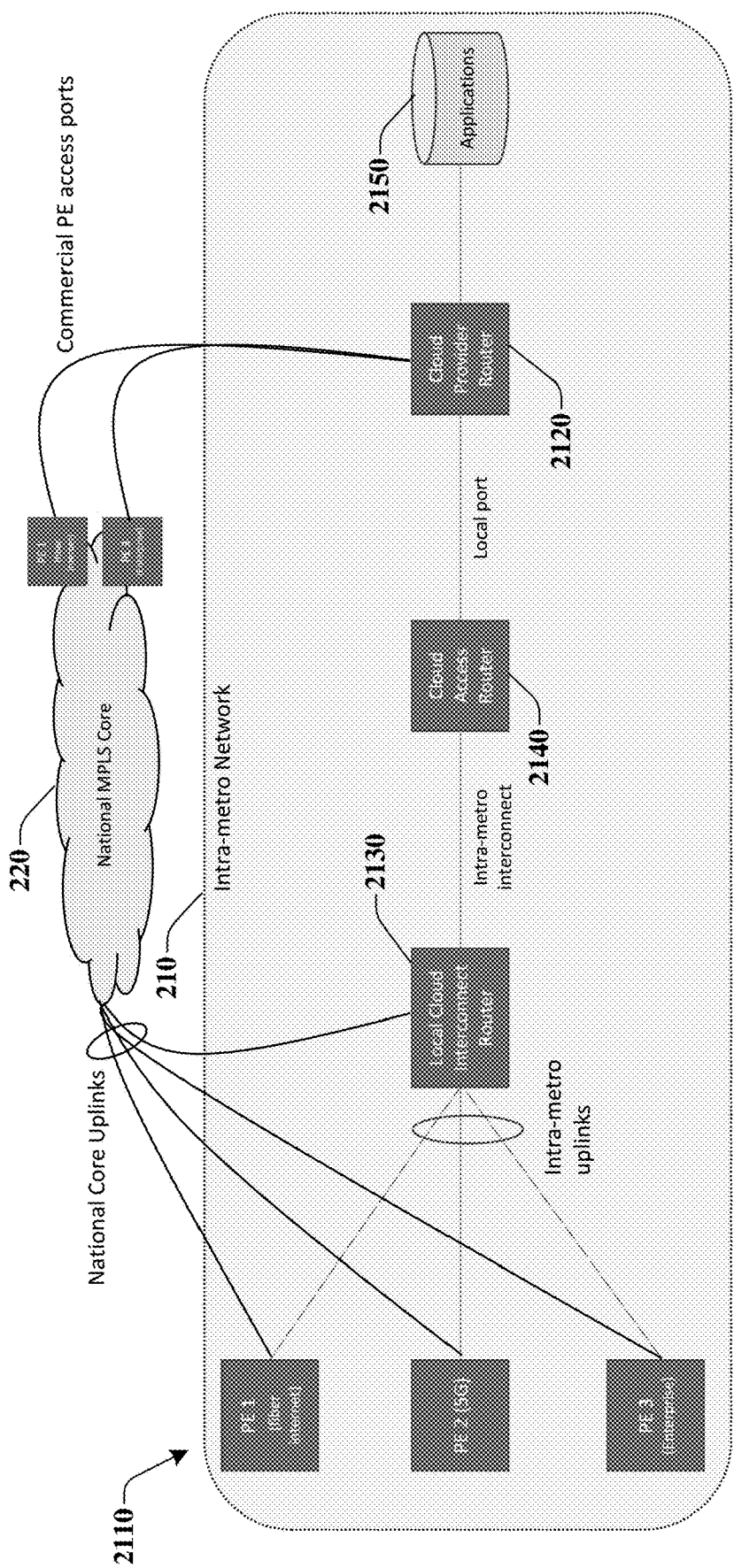
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 includes a network 210 that operates in parallel with a national network 220. Network 210 can enable or otherwise facilitate a more direct connectivity for communication devices with service provider equipment hosting applications (e.g. cloud service providers). In one embodiment, network 210 can be or can include an AKA network. In one embodiment, network 210 can be an intra-metro network, such as defined for a particular geographic location, area or portion of a metropolitan (or higher density population) area with point-to-point connectivity. In one embodiment, the national network 220 can include an MPLS core with connections to PE routers 2110 and service provider routers 2120 (e.g., cloud service provider routers where only one is shown).

In one or more embodiments, particular network elements, such as PEs 2110 and local cloud interconnect router(s) 2130 can be dual homed to the intra-metro network 210 and the national MPLS core network 220. In one or more embodiments, a cloud access router 2140 can be operated by the network provider or its agent, and can be connected directly to the router 2120 of the cloud service provider which is providing the end user device(s) 2280 with access to application(s) 2150. For instance, the CSP router 2120 can provide direct access to cloud applications 2150. In one or more embodiments, local cloud interconnect router 2130 can provide direct local access to intra-metro users such as 5G/6G/NG, fiber, private enterprise layer 3 virtual private networking, enterprise Internet, and so forth.

In one or more embodiments, a network architecture is employed in which some or all of the network elements are given multiple personas to operate from a national perspective or from a local perspective to enable communication devices and/or application service providers to have reachability into a national network but at the same time have reachability into a local or metro network. System 200 employs an access infrastructure that enables access via different techniques and hardware, such as an Internet subscriber using fiber that can terminate on PE1 2110; a wireless subscriber whereby traffic transits on PE2; and/or a private enterprise accessing via PE3. In one embodiment, these access PEs 2110 can connect into a national network (e.g., a national MPLS core 220). In addition to connecting to that national core 220, the PEs 2110 are provided with a local presence via a local network having a local network connection.

In one embodiment, the local cloud interconnect router 2130 facilitates the local connection and can be located or otherwise operate in a same metro (or other defined) area as these access elements (e.g., PEs 2110). In one embodiment, the local cloud interconnect router 2130 would not communicate with, nor have a physical connection with, access PEs 2280 in a different metro area. For example, a local cloud interconnect router 2130 can be in Dallas and the access elements (e.g., PEs 2110) can also be in Dallas with a physical connection therebetween. For any access PE's that are in Washington, DC (not shown), this local cloud interconnect router 2130 in Dallas would not have the same local connections to the PEs in Washington DC but rather there would be a separate instance of this local interconnect router in Washington DC for that purpose.

In one embodiment, a failure in the local domain/network can be determined or otherwise detected and the flow can be diverted to the national infrastructure for failover purposes. The particular condition triggering a failover or switch from a local path to the national path can vary, and can include a fiber cut, equipment failure, an anomalous event, performance threshold requirement, and so forth. In this example of a failover back to the national infrastructure, system 200 may not provide as good a performance utilizing the national infrastructure as it would with the local path, but reachability for the user is maintained.

In one embodiment, the local cloud interconnect router 2130 can communicate with a cloud access router 2140 which can also be owned and managed by the network service provider. In one embodiment, cloud service provider router 2120 can establish a local port into the cloud access router 2140 that gives local access and local reachability, while also having a connection via the national network 220. In one embodiment, some applications 2150 may choose not to utilize the higher performance local network, which may cost more to use.

Figure 2B:
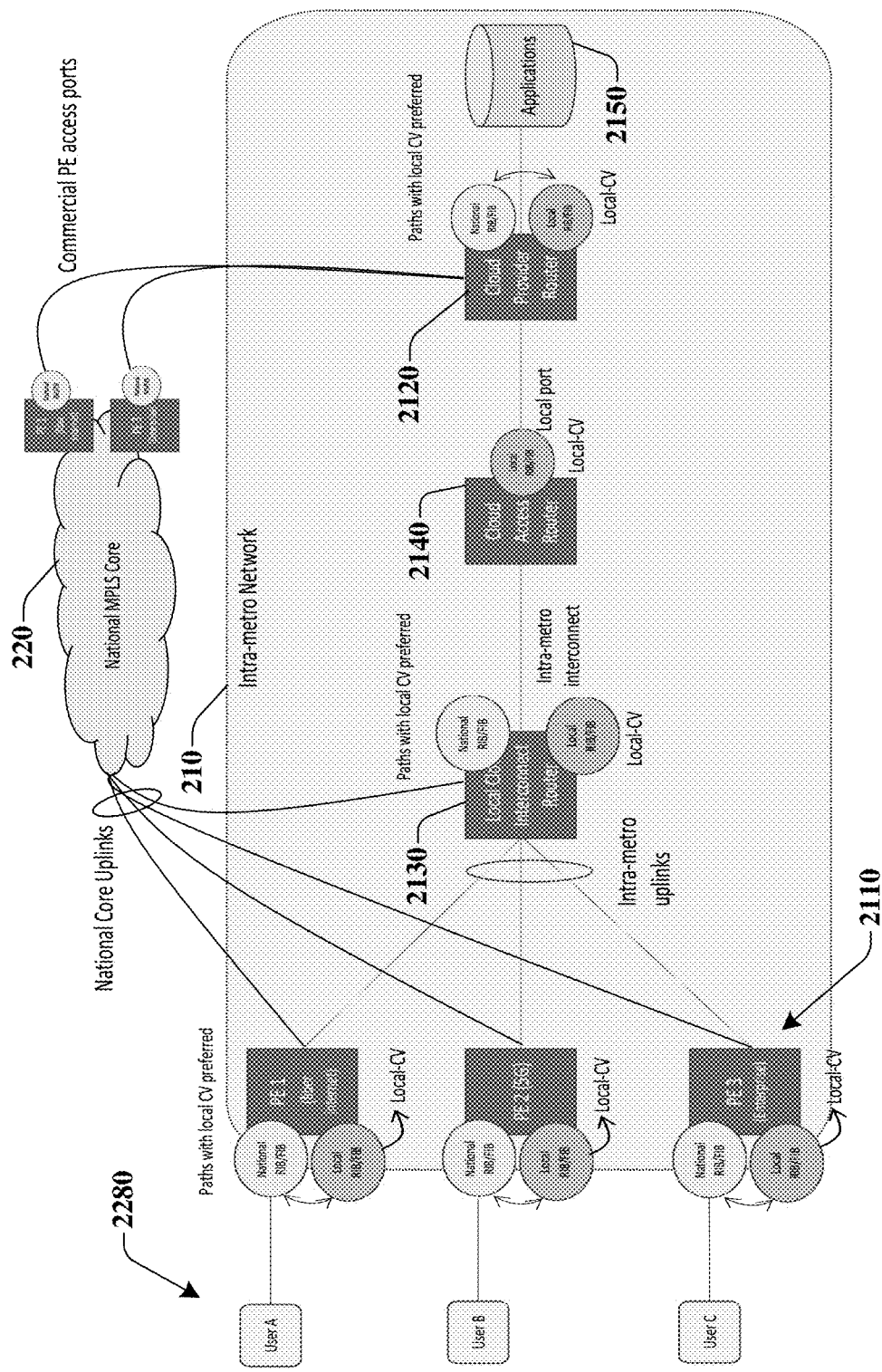
FIG. 2B is a block diagram illustrating an example, non-limiting embodiment of data flow in a system functioning within the communication network of FIG. 1 in accordance with various aspects described herein.

FIG. 2B is a block diagram illustrating an example, non-limiting embodiment of data flow, connections, and routing functions in system 200 functioning within the communication network of FIG. 1 in accordance with various aspects described herein. In one embodiment, PEs 2110 with intra-metro links (or otherwise adapted for selective connection via national and local paths) can be provided with an additional or adjusted routing instance(s) of a local routing information base (RIB) and a local forwarding information base (FIB). This can be in addition to the nation/global RIB/FIB (for use with the MPLS core 220) provisioned to or otherwise accessible by the network elements. In one embodiment, BGP prefixes (e.g., according to or based in part on standard protocols associated with BGP) can be learned from directly attached users and can be added to national and/or local RIBs (and/or FIBs). For example, the local RIB can announce the paths with an attribute such as a local path identifier (e.g., a local community value (CV)), which is one or more embodiments can be a non-transient attribute.

In one embodiment, paths exported from a local RIB to a national RIB can contain the local CV. In one embodiment, the BGP decision process can be augmented or adjusted to consider local community attributes as a second check (e.g., based on detecting or identifying a local CV associated with a path, flow, etc.). In one embodiment, paths with local CVs are preferred (or otherwise selected) over paths without the local CV. The result is traffic which can flow over the local path when a local path is available and tagged with the local CV.

Figure 2C:
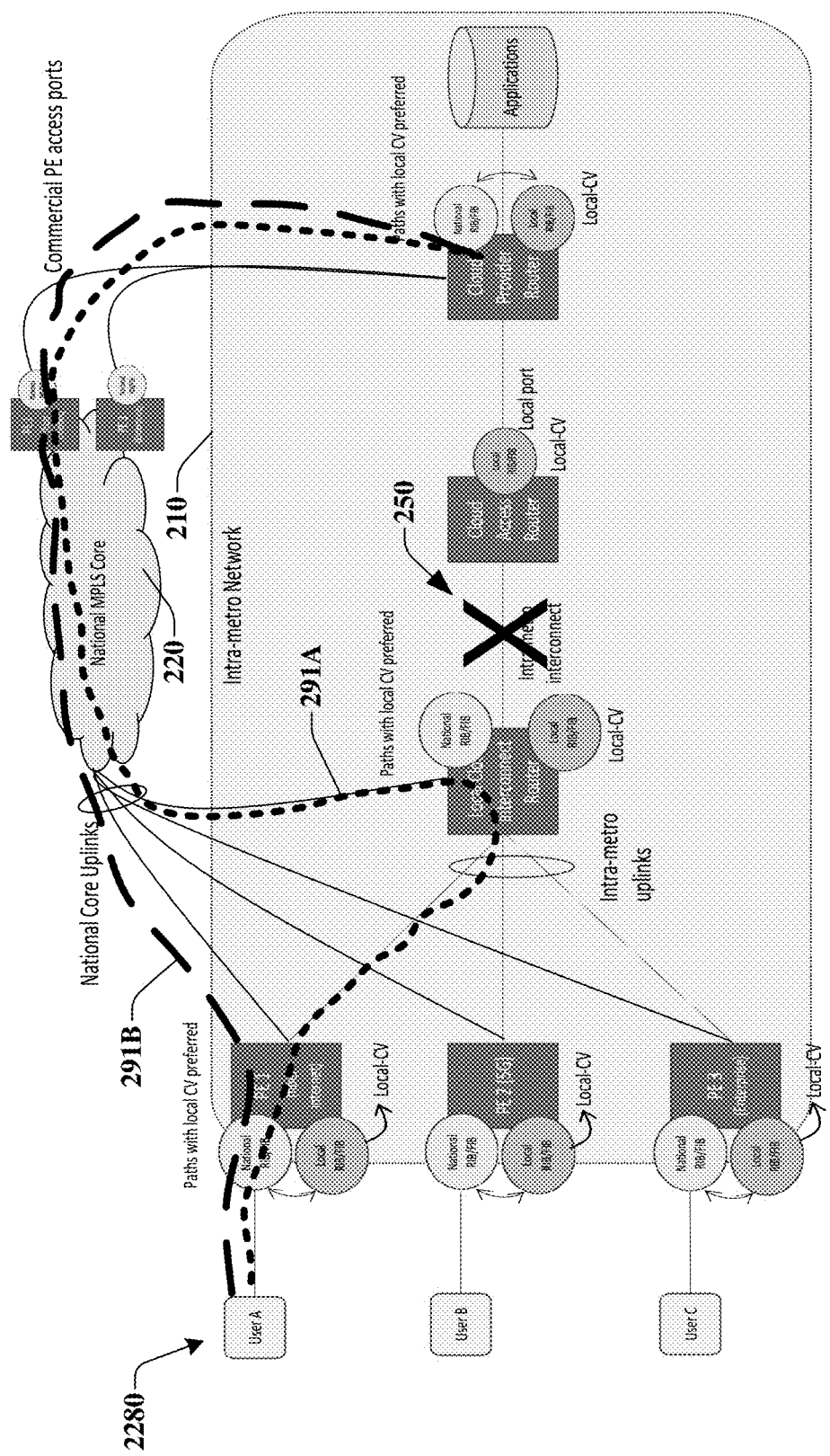
FIG. 2C is a block diagram illustrating an example, non-limiting embodiment of data flow in a system functioning within the communication network of FIG. 1 in accordance with various aspects described herein.

FIG. 2C is a block diagram illustrating an example, non-limiting embodiment of paths, connections, and routing functions in system 200 within the communication network of FIG. 1 in accordance with various aspects described herein. In one embodiment, system 200 can utilize local and national RIBs/FIBs in conjunction with local path identifiers (e.g., local CVs) to ensure that when a local network (and local path that can avoid or bypass the MPLS core) is present and active, traffic coming from the cloud environment out to customers, as well as traffic coming from customers into the cloud environment, can be selectively routed over the local path.

In one embodiment, traffic from the cloud into the customers (e.g., gaming type traffic) can be managed by sending an announcement to the cloud environment in order to receive the traffic. In one embodiment, a local RIB is deployed that has a relationship to the national/global RIB. For example, the local RIB may be maintained such that it does not have all of the routes that are in the global RIB but does have routes that have been learned locally (e.g., received into the global RIB of the network element) and which have then been redistributed into the local RIB because the routing information has a local context associated with it. For instance, once in the local RIB/FIB environment, prior to being announced, the local path identifier/local CV can be added as an attribute. While some embodiments are described as having a non-transitive local CV, other embodiments could apply a transitive local CV. The local path identifier/local CV essentially provides information on a prefix being local as opposed to being national. As an example, when the local CV gets propagated downstream to the local cloud interconnect router 2130 it is then propagated to the cloud access router 2140, and ultimately ends up at the cloud service provider router 2120. At this point, the cloud service provider router 2120 can also import the routing information with local path identifier/local CV into its own local RIB followed by providing it to the national RIB.

In one embodiment, when the national RIB executes a path selection algorithm, it analyzes for all paths that have the local path identifier/local CV. For example, the finite state machine can consider paths with this local CV attribute to be preferred over all other paths. In one embodiment, the PE 2110 that is announcing the local path (over the intra-metro network) is also announcing that exact same path over the national core 220 which will be routed to the same cloud provider. In this example, when these announced two paths meet in the cloud service provider router 2120 (i.e., the national path as well as the local path), the cloud service provider router will prefer the local path thereby providing that a customer (who has subscribed to the service to obtain these local capabilities) will be provided improved performance when the application is instantiated. In one embodiment, traffic that is then sent to the national RIB can be provided or forwarded to the local RIB because the prefix indicates that there is a local prefix available to provide access to this customer (e.g., a local path indicated by the local path identifier/local CV).

Similarly, the local path determination (based on the availability of the local prefix) can be made in the opposite direction by the network provider element(s) such as the cloud access router 2140 and the local cloud interconnect router 2130

In one embodiment, the use of local paths instead of the national paths can be intelligently/dynamically applied (e.g., by the network service provider), such as on a per application basis (e.g., users subscribed to the service), per type of application (e.g., gaming vs. watching content), according to network performance balancing (e.g., according to a performance threshold or an analysis of network conditions including conditions of the intra-metro network and/or the national network), per geographic area, per cloud service provider identity, and so forth.

In one embodiment, the selective use of the local connection can also be based on conditions of the local path or local network. As an example, a fault may occur along the local path which is illustrated at 250. Based on the fault (or other condition that would cause the network provider to choose the national core 220), the path can be switched to a national path-two of which are shown at 291A and 291B. In this example, system 200 can route the traffic through the MPLS core 220 to the local cloud interconnect router 2130 which then provides the traffic to the appropriate PE router 2110 or system 200 can route the traffic through the MPLS core 220 to the appropriate PE router 2110 and bypass the local cloud interconnect router 2130. In one embodiment, the selection between paths 291A and 291B can be performance based. In one embodiment when prefixes are advertised, a string of attributes associated with that local prefix can be provided that indicates exactly which routers are to be utilized. In one embodiment, information on a prefix can be stored for recovery computation including latency metrics between network elements, such as distance/latency between the cloud access router and the cloud interconnect router via the national core, the distance/latency between the cloud access router and the access PE via the national core, and so forth. In one embodiment, the latency metrics between segment paths or network elements can be aggregated to determine which path to utilized (e.g., path 291A or 291B). In one embodiment, latency evaluation or scoring can be applied between network elements or segment paths to determine whether to select a local path rather than a national core path. In one embodiment, the local path is selected by default (rather than the national path) when it is available without calculating a latency score. In one embodiment, path selection including latency scoring can take into account congestion is a particular network or portion of the network.

In one embodiment, different applications can have different requirements (e.g., packet loss threshold, congestion threshold, latency threshold, and so forth). In this example, these requirements can be associated a traffic flow for the application and/or can be persistent. In one embodiment, is system 200 determines that it can no longer support that application, the local network can detect same and remove the local path identifier/local CVS. In one embodiment, the local path can be selected for a portion of an application's traffic based on type of data, such as where different IP addresses are being utilized and different metric criteria (e.g., audio data versus video data). In this example, the other portion of the data can be routed via the MPLS core 220. Other criteria can also be applied such as first data that is sensitive to latency utilizing one path and other data that is sensitive to throughput using a different path.

In one embodiment, a prefix can be learned into a PE via local prefixes and via the core. In one embodiment, the national RIB/FIB can always be identical on all the routers, while the local RIB/FIB on any given router may be distinct because it maintains just the local routes and does not maintain non-local routes.

Figure 2D:
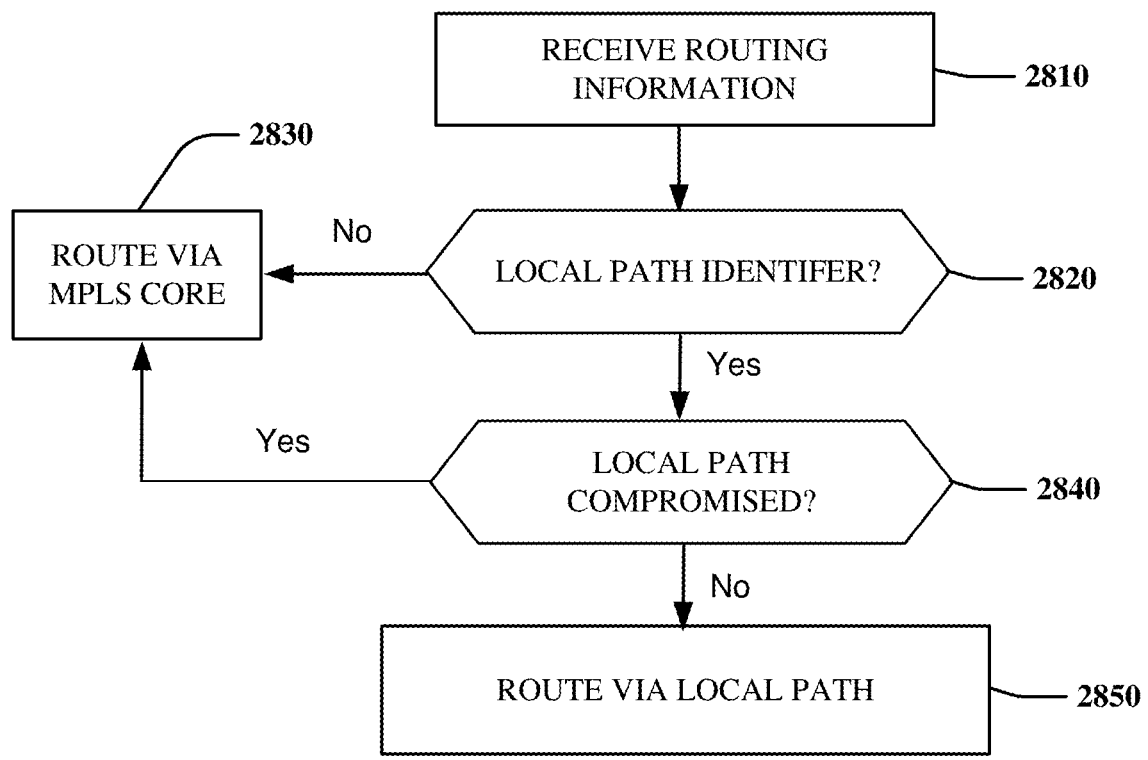
FIG. 2D depicts an illustrative embodiment of a method in accordance with various aspects described herein.

FIG. 2D depicts an illustrative embodiment of a method 280 in accordance with various aspects described herein. At 2810, routing information can be received or otherwise obtained by a network element (e.g., a cloud service provider router, a local cloud interconnect router, a PE router, a virtual machine operating as a network element, and so forth). The routing information can be various types of information including BGP prefixes and/or local path identifiers (e.g., a local CV). The routing information can be sourced or adjusted by various devices including end user devices, network elements, RIBs/FIBs (including global and local) of various network elements, and so forth.

One or more of the steps or functions of method 280 can be performed by one or more devices or virtual functions including PE equipment (e.g., PE routers), local cloud interconnect equipment (e.g., local cloud interconnect routers), cloud access equipment (e.g., cloud access routers), cloud service provider equipment (e.g., cloud service provider routers). In one or more embodiments, one, some or all of these devices/equipment are located in, or otherwise part of, an AKA network (e.g., an Intra-metro network) that can operate in parallel to a national MPLS core.

At 2820, a determination can be made as to whether routing information for a particular flow has a local path identifier. If there is no local path identifier then at 2830 the traffic can be routed via the MPLS core. However, if a cloud service provider router receives routing information corresponding to an end user device that is announced over a first path via a MPLS core; and receives adjusted routing information generated based on the routing information that is announced over a second path that avoids the MPLS core (i.e., the local path), where the adjusted routing information includes a local path identifier, then method 280 can proceed to 2840 to determine if the local path is compromised or otherwise determine whether conditions are suitable for utilizing the local path. If the local path is not desired or is otherwise compromised (e.g., a fiber cut, equipment overload, fault, and so forth) then method 280 can revert back to 2830 whereby the traffic can be routed via the MPLS core. However, if it is determined that the local path should be utilized (e.g., generally the local path will provide lower latency and improved performance as compared to the national path through the MPLS core) then the traffic between the end user device and the application can be routed via the second, local path according to the local path identifier so as to avoid or bypass the MPLS core.

In one or more embodiments, method 280 enables selecting between paths for traffic to be routed between a communication device and an application of a service provider where the selecting is based on receiving or otherwise obtaining a local path identifier; and routing the traffic between the communication device and the application of the service provider via a local path responsive to the local path identifier, where the local path bypasses the MPLS core, and where a potential non-local path of the paths is over the MPLS core. In one embodiment, the network element can receive routing information over both the first (e.g., national) and second (e.g., local) paths.

In one embodiment, the network element can receive routing information including the local path identifier over the second, local path. In one embodiment, the network element is one of a cloud service provider router or a local cloud interconnect router operated by a communication service provider. In one embodiment, the network element includes a national RIB associated with the MPLS core and includes a local RIB associated with an intra-metro network over which the second, local path is connected.

In one embodiment, the network element can select the first, national path (via the MPLS core) for a portion of the traffic to be routed between the communication device and the application responsive to a determination of a fault condition along the second path. In one embodiment, the second, local path includes a local cloud interconnect router operated by a communication service provider associated with the MPLS core, and the first, national path is selected to either include or bypass the local cloud interconnect router responsive to a latency score analysis associated with the traffic. In one embodiment, the first and second paths both include a same edge router that is selected according to a location of the communication device. In one embodiment, the same edge router is selected among a group of edge routers that are each dual homed to the MPLS core and to an intra-metro network over which the second path is connected.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 280 presented in FIGS. 1, 2A, 2B, 2C, 2D and 3. For example, virtualized communication network 300 can facilitate in whole or in part selecting between paths for traffic to be routed between a communication device and an application of a cloud service provider, where the selecting is based on receiving or otherwise obtaining a local path identifier (e.g., announced by a local RIB associated with an intra-metro network over which a local path is connected); and routing the traffic between the communication device and the application of the cloud service provider via the local path responsive to the local path identifier, where the local path bypasses or otherwise avoids an MPLS core, and where a non-local path of the paths is over the MPLS core.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
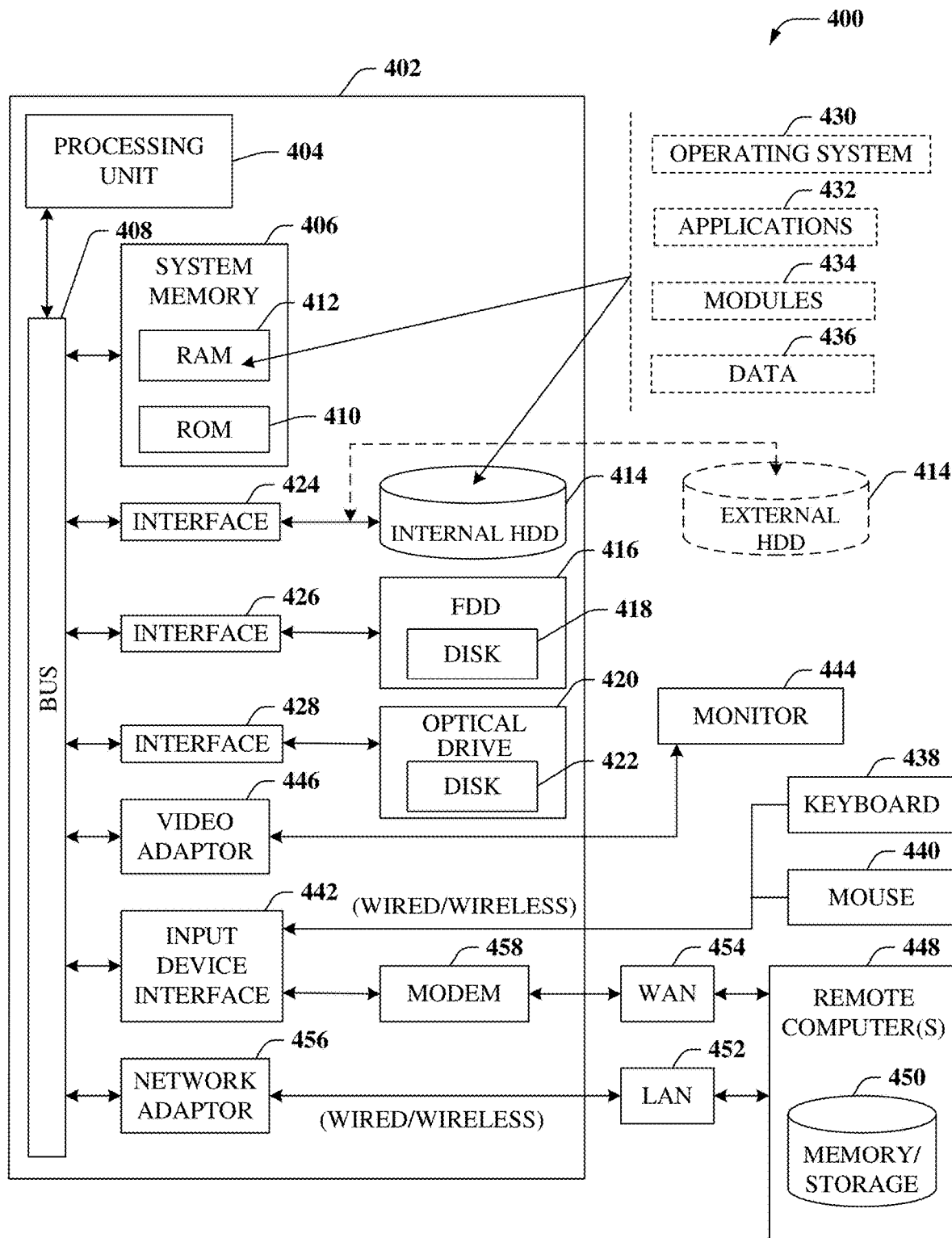
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part selecting between paths for traffic to be routed between a communication device and an application of a cloud service provider, where the selecting is based on receiving or otherwise obtaining a local path identifier (e.g., announced by a local RIB associated with an intra-metro network over which a local path is connected); and routing the traffic between the communication device and the application of the cloud service provider via the local path responsive to the local path identifier, where the local path bypasses or otherwise avoids an MPLS core, and where a non-local path of the paths is over the MPLS core.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
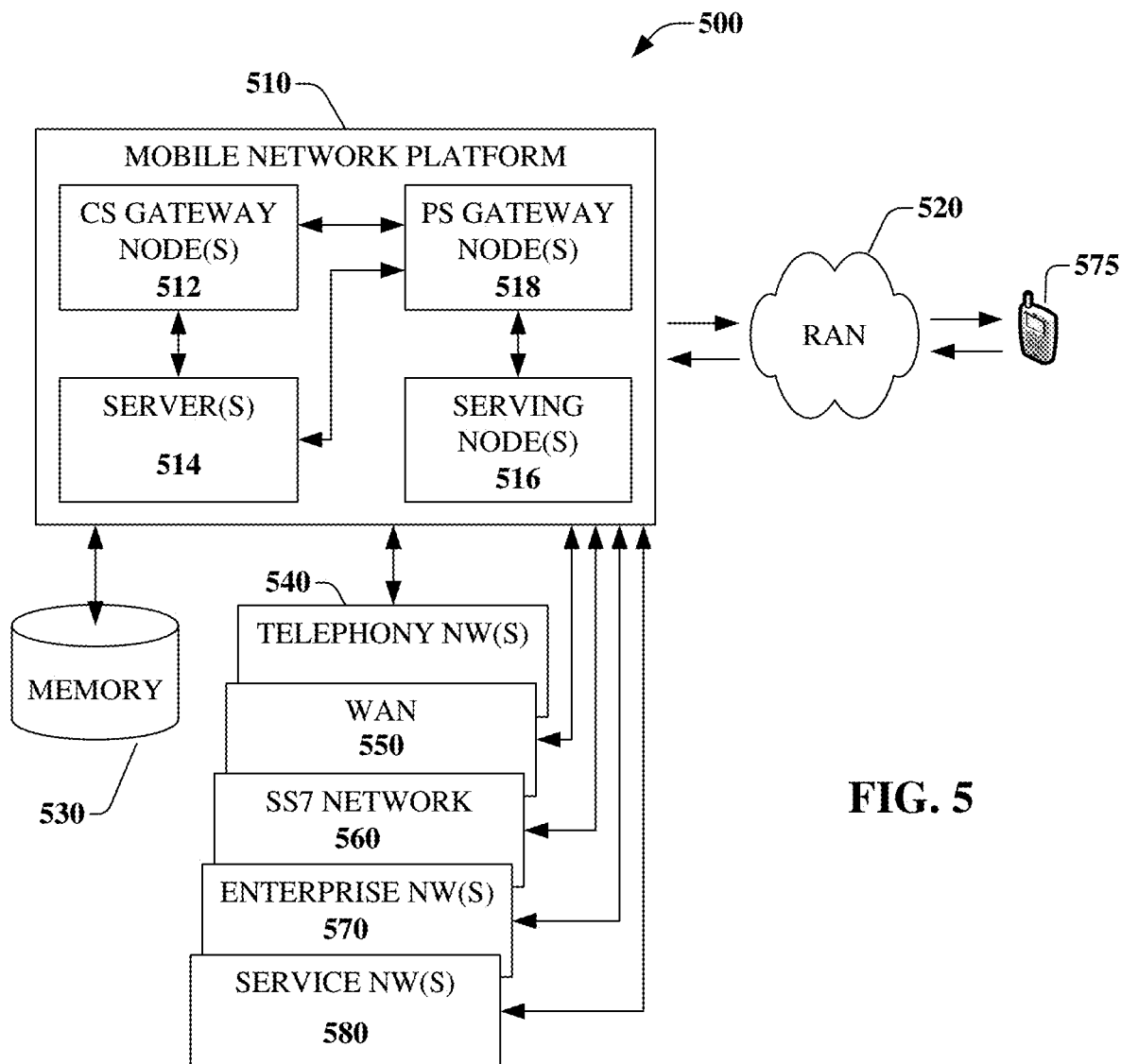
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part selecting between paths for traffic to be routed between a communication device and an application of a cloud service provider, where the selecting is based on receiving or otherwise obtaining a local path identifier (e.g., announced by a local RIB associated with an intra-metro network over which a local path is connected); and routing the traffic between the communication device and the application of the cloud service provider via the local path responsive to the local path identifier, where the local path bypasses or otherwise avoids an MPLS core, and where a non-local path of the paths is over the MPLS core. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
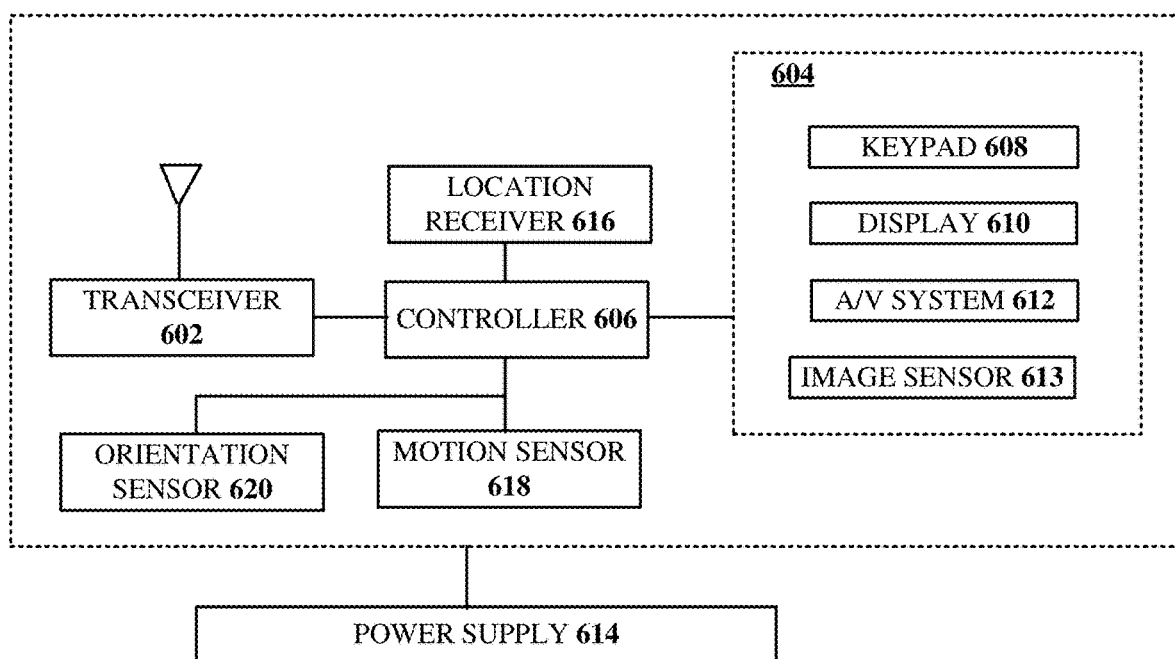
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part selecting between paths for traffic to be routed between a communication device and an application of a cloud service provider, where the selecting is based on receiving or otherwise obtaining a local path identifier (e.g., announced by a local RIB associated with an intra-metro network over which a local path is connected); and routing the traffic between the communication device and the application of the cloud service provider via the local path responsive to the local path identifier, where the local path bypasses or otherwise avoids an MPLS core, and where a non-local path of the paths is over the MPLS core.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations.

That is, if X employs A; X employs B; or X employs both A and B, then "X employs A or B" is satisfied under any of the foregoing instances.

In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving routing information corresponding to an end user device that is announced over a first path via a Multiprotocol Label Switching (MPLS) core;
receiving adjusted routing information corresponding to the end user device that is generated based on the routing information, wherein the adjusted routing information is announced over a second path that includes a local cloud interconnect router having a national Routing Information Base (RIB) associated with the MPLS core, wherein the second path avoids the MPLS core, and wherein the adjusted routing information includes a local path identifier; and routing traffic to the end user device via the second path according to the local path identifier.

2. The device of claim 1, wherein the processing system is operated by a cloud service provider, wherein the traffic comprises data to be downloaded from a cloud service application operated by the cloud service provider, and wherein the local cloud interconnect router is operated by a communication service provider associated with the MPLS core.

3. The device of claim 2, wherein the local cloud interconnect router includes a local RIB associated with an intra-metro network over which the second path is connected.

4. The device of claim 3, wherein the routing information is announced from the national RIB, and wherein the adjusted routing information is announced from the local RIB.

5. The device of claim 3, wherein the second path includes a cloud access router connected between the device and the local cloud interconnect router.

6. The device of claim 5, wherein at least one of the cloud access router or the local cloud interconnect router is instantiated as a virtual machine for the second path.

7. The device of claim 1, wherein the first and second paths both include a same edge router that is selected according to a location of the end user device.

8. The device of claim 7, wherein the same edge router is selected among a group of edge routers that are each dual homed to the MPLS core and to an intra-metro network over which the second path is connected.

9. A method, comprising:
selecting, by a processing system including a processor, between first and second paths for traffic to be routed between a communication device and an application of a cloud service provider, wherein the selecting is based on determining that a local path identifier has been received in adjusted routing information corresponding to the communication device and that is announced over the second path, wherein the adjusted routing information includes a local cloud interconnect router having a national Routing Information Base (RIB) associated with a Multiprotocol Label Switching (MPLS) core; and routing, by the processing system, the traffic between the communication device and the application of the cloud service provider via the second path responsive to the local path identifier, wherein the first path is via the MPLS core, and wherein the second path avoids the MPLS core.

10. The method of claim 9, comprising:
receiving, by the processing system, routing information over both the first and second paths.

11. The method of claim 9, comprising:
receiving, by the processing system, routing information including the local path identifier over the second path.

12. The method of claim 9, wherein the processing system operates in one of a cloud service provider router or the local cloud interconnect router operated by a communication service provider.

13. The method of claim 12, wherein the processing system includes the national RIB associated with the MPLS core and includes a local RIB associated with an intra-metro network over which the second path is connected.

14. The method of claim 9, comprising: selecting, by the processing system, the first path for a portion of the traffic to be routed between the communication device and the application of the cloud service provider responsive to a determination of a fault condition along the second path.

15. The method of claim 14, wherein the second path includes the local cloud interconnect router operated by a communication service provider associated with the MPLS core, and wherein the first path is selected to either include or bypass the local cloud interconnect router responsive to a latency score analysis associated with the traffic.

16. The method of claim 9, wherein the first and second paths both include a same edge router that is selected according to a location of the communication device.

17. The method of claim 9, wherein a same edge router is selected among a group of edge routers that are each dual homed to the MPLS core and to an intra-metro network over which the second path is connected.

18. A non-transitory machine-readable medium, comprising executable instructions that, when executed by a processing system including a processor, facilitate performance of operations, the operations comprising:
selecting between paths for traffic to be routed between a communication device and an application of a cloud service provider, wherein the selecting is based on receiving a local path identifier in adjusted routing information corresponding to the communication device, wherein the adjusted routing information includes a local cloud interconnect router having a national Routing Information Base (RIB) associated with a Multiprotocol Label Switching (MPLS) core; and
routing the traffic between the communication device and the application of the cloud service provider via a local path responsive to the local path identifier, wherein the local path bypasses the MPLS core, and wherein a non-local path of the paths is over the MPLS core.

19. The non-transitory machine-readable medium of claim 18, wherein the local path identifier is announced by a local RIB associated with an intra-metro network over which the local path is connected.

20. The non-transitory machine-readable medium of claim 19, wherein the processing system operates in one of a cloud service provider router or the local cloud interconnect router operated by a communication service provider, wherein the processing system includes the national RIB associated with the MPLS core and includes the local RIB.

* * * * *